US007006761B2

(12) United States Patent
Herke

(10) Patent No.: US 7,006,761 B2
(45) Date of Patent: Feb. 28, 2006

(54) CONTROL DEVICE FOR DC MOTORS

(75) Inventor: Dirk Herke, Nuertingen (DE)

(73) Assignee: Alcoa Fujikura Gesellschaft mit beschraenkter Haftung, Frickenhausen (DE)

( * ) Notice: Subject to any disclaimer, the term of this patent is extended or adjusted under 35 U.S.C. 154(b) by 0 days.

(21) Appl. No.: 10/743,853

(22) Filed: Dec. 22, 2003

(65) Prior Publication Data
US 2005/0074229 A1 Apr. 7, 2005

Related U.S. Application Data

(63) Continuation of application No. PCT/EP02/06768, filed on Jun. 19, 2002.

(30) Foreign Application Priority Data
Jun. 26, 2001 (DE) ................ 101 32 909

(51) Int. Cl.
H02P 5/06 (2006.01)
(52) U.S. Cl. ............. 388/804; 388/829; 388/811; 318/254; 318/439; 318/541; 310/233; 310/248
(58) Field of Classification Search .......... 318/244, 318/245, 139, 439, 254, 690, 695; 388/800–841
See application file for complete search history.

(56) References Cited

U.S. PATENT DOCUMENTS

| 3,557,325 A | * | 1/1971 | Hansen | 200/19.07 |
| 3,786,287 A | * | 1/1974 | Stein | 310/46 |
| 3,820,000 A | * | 6/1974 | Smith | 320/107 |
| 3,875,495 A | * | 4/1975 | Middlebrook | 363/32 |
| 4,240,014 A | * | 12/1980 | Muller | 388/811 |
| 4,264,847 A | | 4/1981 | Sanders, Jr. et al. | |
| 4,334,188 A | * | 6/1982 | Dudley | 324/133 |
| 4,479,079 A | | 10/1984 | Hanner | |
| 4,500,819 A | * | 2/1985 | Trusock et al. | 318/106 |
| 4,827,897 A | * | 5/1989 | Yamada et al. | 123/497 |
| 4,948,997 A | * | 8/1990 | Ohmitsu et al. | 310/113 |
| 5,023,532 A | * | 6/1991 | Gakenholz | 318/541 |
| 5,311,615 A | * | 5/1994 | Couetoux | 388/836 |
| 5,412,268 A | * | 5/1995 | Arnaud et al. | 310/67 R |
| 5,473,227 A | * | 12/1995 | Arnaud et al. | 318/139 |
| 5,485,064 A | * | 1/1996 | Arnaud et al. | 318/139 |
| 5,522,653 A | * | 6/1996 | Fulks et al. | 303/162 |

(Continued)

FOREIGN PATENT DOCUMENTS

DE 37 17 481 12/1988

(Continued)

Primary Examiner—Marlon T. Fletcher
Assistant Examiner—Renata McCloud
(74) Attorney, Agent, or Firm—Lipsitz & McAllister, LLC

(57) ABSTRACT

In order to design as inexpensively as possible a control device for DC motors which are provided with a commutator for feeding their motor windings which has at least four sliding contacts, this device comprising a modulation stage which generates at least one control signal modulated as to pulse width with a clock frequency substantially above the motor speed and a control circuit which is controlled by the at least one control signal and has at least one load branch which feeds the commutator and is provided with an electronic switch controlled by the control signal modulated as to pulse width, it is suggested that the sliding contacts be combined to form at least two control groups, that the sliding contacts be combined within each control group to form pairs of sliding contacts and that each control group have its own load branch associated with it.

26 Claims, 12 Drawing Sheets

U.S. PATENT DOCUMENTS

| | | | |
|---|---|---|---|
| 5,552,686 A * | 9/1996 | Schmid et al. | 318/362 |
| 5,602,957 A * | 2/1997 | Wille et al. | 388/836 |
| 5,623,177 A * | 4/1997 | Dimatteo et al. | 310/242 |
| 5,898,288 A * | 4/1999 | Rice et al. | 318/685 |
| 5,914,576 A * | 6/1999 | Barba | 318/282 |
| 5,925,999 A * | 7/1999 | Lakerdas et al. | 318/496 |
| 5,942,864 A * | 8/1999 | Charreton | 318/254 |
| 6,009,362 A * | 12/1999 | Furukawa | 701/29 |
| 6,177,746 B1 * | 1/2001 | Tupper et al. | 310/166 |
| 6,310,405 B1 * | 10/2001 | Han et al. | 290/7 |
| 6,388,355 B1 * | 5/2002 | Tanaka et al. | 310/179 |
| 6,448,676 B1 * | 9/2002 | Kershaw et al. | 310/68 R |
| 6,479,917 B1 * | 11/2002 | Yamazaki | 310/239 |
| 6,617,816 B1 * | 9/2003 | Ohno et al. | 318/560 |
| 6,680,596 B1 * | 1/2004 | DeCicco | 318/439 |

FOREIGN PATENT DOCUMENTS

| | | |
|---|---|---|
| DE | 195 06 273 | 9/1996 |
| DE | 199 15 876 | 1/2001 |

* cited by examiner

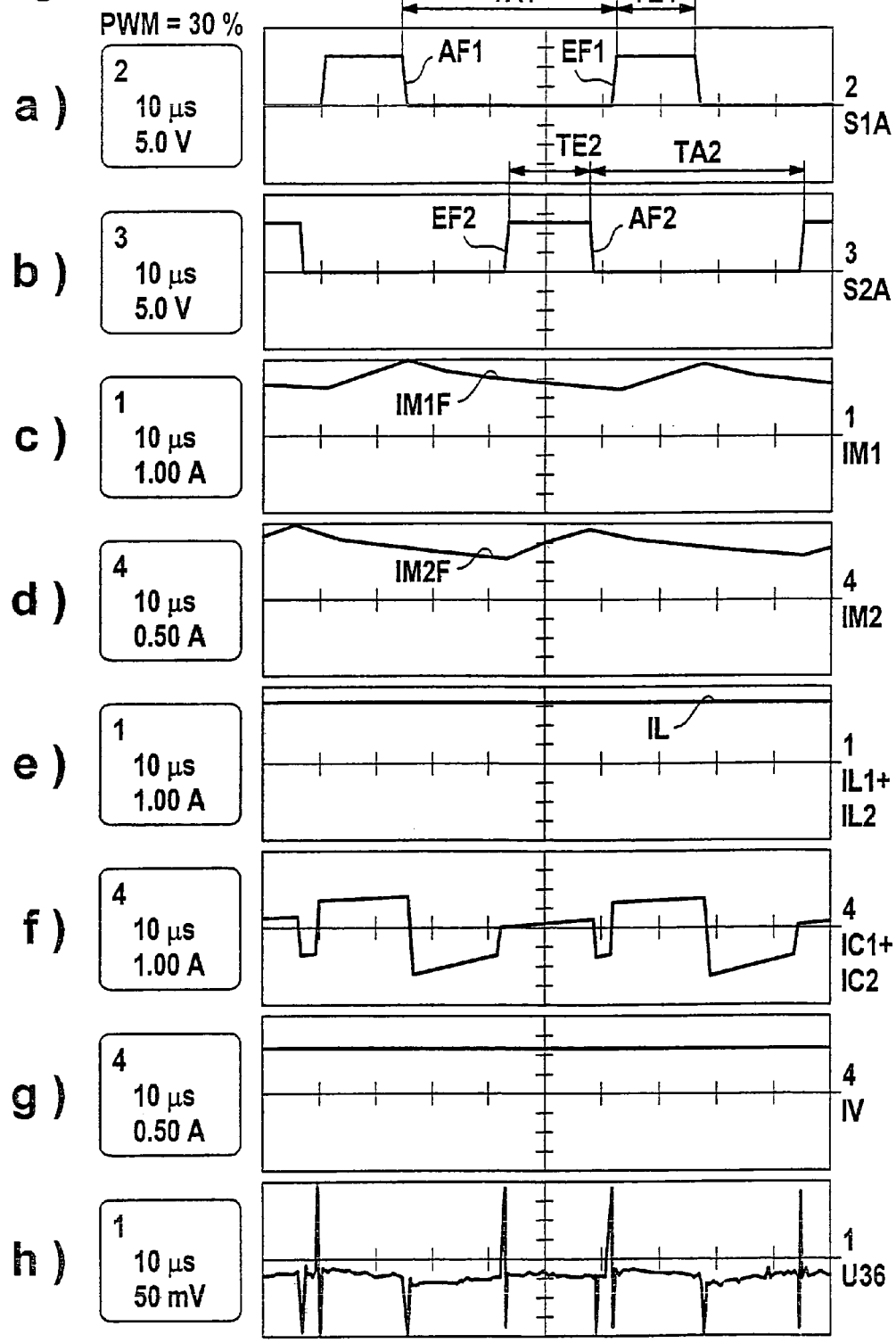

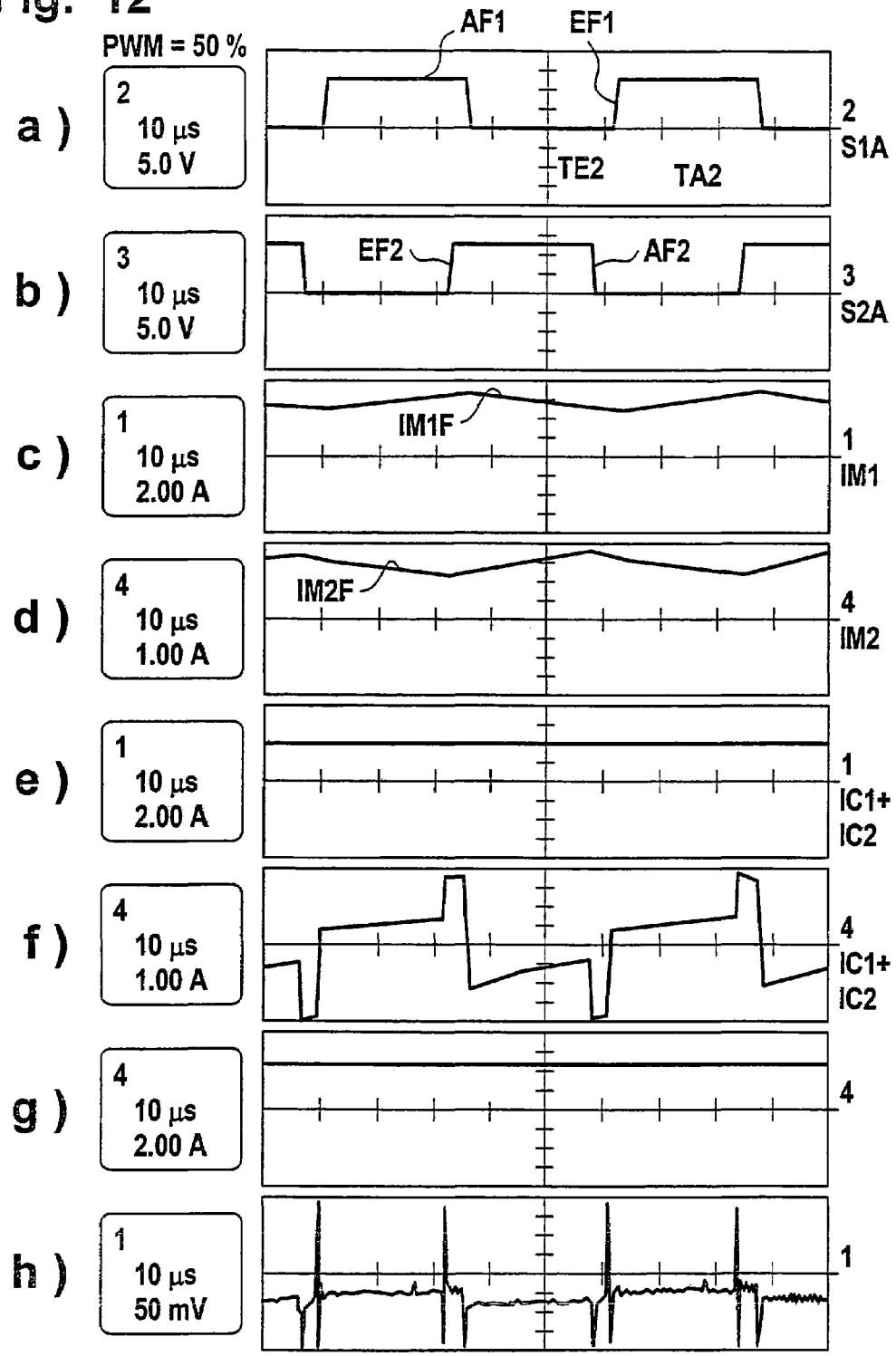

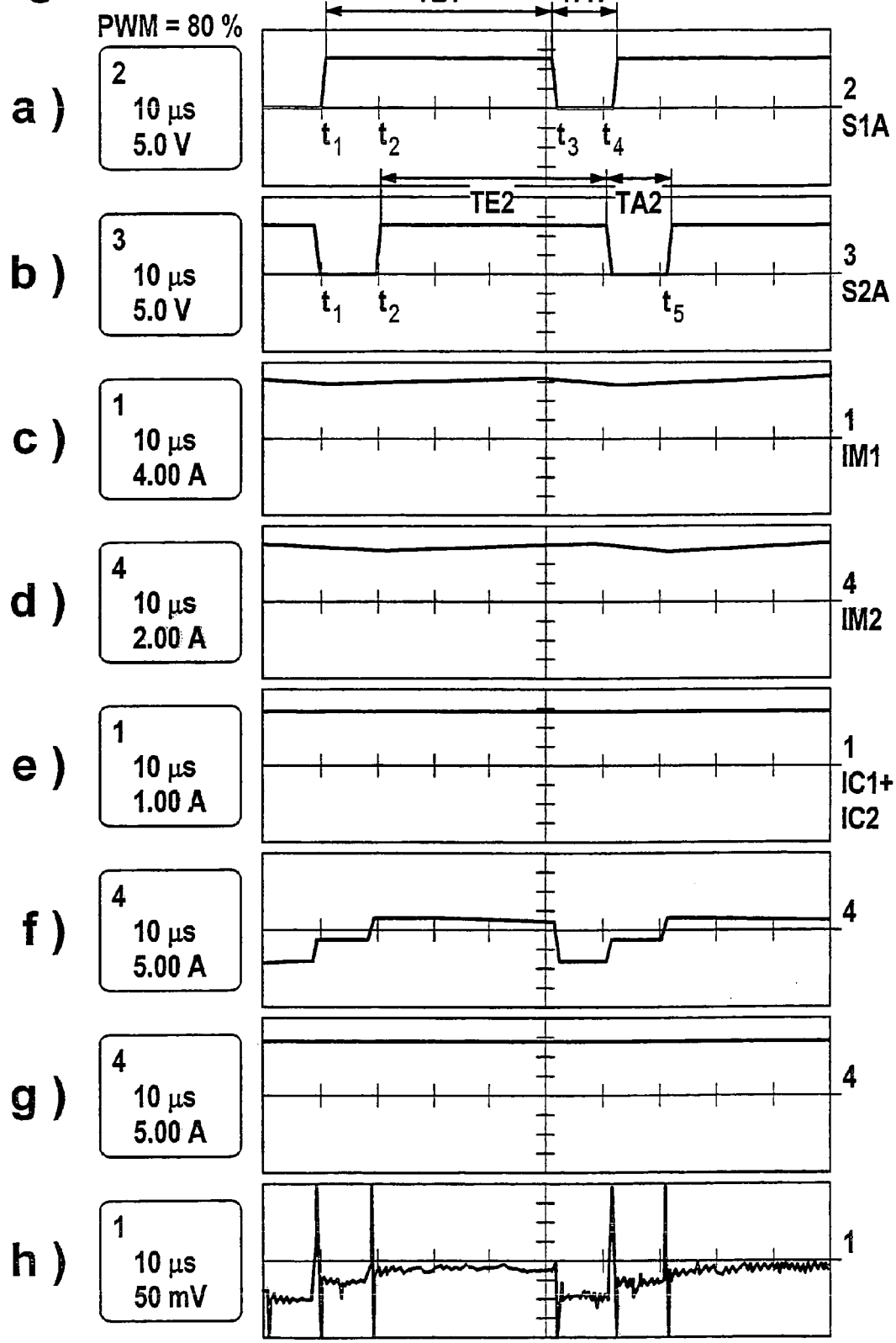

CONTROL DEVICE FOR DC MOTORS

The present disclosure relates to the subject matter disclosed in and is a continuation of International application No. PCT/EP02/06768 of Jun. 19, 2002, which is incorporated herein by reference in its entirety and for all purposes.

BACKGROUND OF THE INVENTION

The invention relates to a control device for DC motors which are provided with a commutator for feeding their motor windings which has at least four sliding contacts, the control device comprising a modulation stage which generates at least one control signal which is modulated as to pulse width with a clock frequency substantially above the motor speed and a control circuit which is controlled by the at least one control signal and has at least one load branch which feeds the commutator and is provided with an electronic switch controlled by the control signal modulated as to pulse width.

Control devices of this type are not known from the state of the art, wherein the entire commutator with all the sliding contacts of the DC motor is always controlled by a single load branch.

A load branch of this type is to be dimensioned in accordance with the power of the electromotor, wherein the control device, in particular, must be designed such that it bears the freewheeling current which occurs and that the reactive effect of the pulse width modulation on a power system feeding the control device is as small as possible.

The object underlying the invention is to design a control device as inexpensively as possible.

SUMMARY OF THE INVENTION

This object is accomplished in accordance with the invention, in a control device of the type described at the outset, in that the sliding contacts are combined to form at least two control groups, that the sliding contacts are combined within each control group to form pairs of sliding contacts and that each of the control groups has its own load branch associated with it.

The advantage of the inventive solution is to be seen in the fact that as a result of the power being divided between at least two control groups and each of the control groups having its own load branch associated with it the electric power which is to be connected by each load branch is reduced. This results in considerable cost advantages to the extent that, as a result, considerably more inexpensive components can be used which lead to a reduction in the costs despite the fact that two load branches are provided instead of one load branch and, therefore, more components.

Moreover, an additional, considerable advantage of the inventive solution consists in the greater security against malfunctions since even with the breakdown of one load branch or one motor winding the DC motor still runs, namely due to the fact that the other load branch is still operating. As a result, the full power of the DC motor can no longer be obtained but it is of decisive importance, in particular, in the case of auxiliary units for motor vehicles, for example, a DC motor for operating a fan, whether the auxiliary unit breaks down completely on account of component damage in the load branch or a defective motor winding or when the DC motor is maybe not operating with full power but still in the range of partial power.

Within the scope of the present invention, the motor windings are designated as inductive loads for reasons of simplification although, to be exact, they also have an ohmic resistor and a capacitor.

The inventive solution may be used particularly advantageously when more than two pairs of sliding contacts are present and, therefore, also more than two control groups, i.e., for example at least three control groups or more are used and, therefore, three load branches or more since the failure of one load branch or one motor winding then leads only to a slight reduction in power of the DC motor which allows at least a temporary emergency operation, for example, in a motor vehicle.

With respect to the design of the load branches, no further details have been given. One particularly favorable solution provides for each load branch to comprise an electronic switch connected in series to the pairs of sliding contacts and a freewheeling component which serves, in particular, to protect the electronic switch and is in a position to take over the freewheeling current of the motor winding when the electronic switch is switched off.

With respect to the control of the various load branches, the most varied of solutions are conceivable. For example, it would be conceivable to design the modulation stage such that it controls all the load branches with a single control signal modulated as to pulse width so that the load branches all operate in parallel with the same control signal.

It is, however, particularly advantageous when the modulation stage generates a separate control signal modulated as to pulse width for each of the load branches; this offers the possibility of controlling the load branches individually.

However, in order to design the different control of the load branches as simply as possible it is preferably provided for the at least two control signals to have the same period duration.

In addition, it is advantageously provided for the at least two control signals to have an identical pulse width modulation, i.e., have identical behavior from a switch-on time period to the switch-off time period. As a result, simplifications with respect to circuit engineering are possible, in particular, for the generation of the control signals modulated as to pulse width.

Furthermore, it is favorable, in particular, in order to be able to operate the load branches synchronously, when the at least two control signals are phase-locked in relation to one another.

It is even more advantageous when the control signals modulated as to pulse width are shifted in phase relative to one another since it is then possible to operate the load branches such that their current consumption is distributed with respect to time in as optimum a manner as possible in order to minimize the reactive effects of the control device on a power system supplying it, for example, the electrical system of a motor vehicle, for example, due to the fact that the one of the load branches feeds current to the motor winding associated with it where possible when the other one of the load branches does not feed current to the motor winding associated with it.

This may be realized particularly favorably when the switch-on time period of one of the load branches and the switch-off time period of the other one of the load branches are predetermined relative to one another and when the time interval between the switch-on time period of the one of the load branches and the switch-on time period of the other one of the load branches varies in accordance with the value of the PWM ratio to be set. This solution allows the load branches to be operated with control signals which are modulated as to pulse width and phase-locked relative to one another, wherein the phase position is, however, varied, where applicable, by the PWM ratio in order to design the control device such that this has current requirements which are as uniform as possible when seen over time.

In this respect, it is particularly expedient when a control controls the load branches such that one of the load branches is switched on when the other one of the load branches is switched off. As a result, a state can be achieved at least for some of the period duration or the clock cycle, with which one load branch is in the freewheeling state at least temporarily and the other one in the state supplied with current.

Furthermore, it is of advantage when in a first operating range each of the load branches is switched on only when the respectively other load branch is switched off.

This mode of operation allows the current requirements of the load branches to be of as uniform a configuration as possible over time and, where applicable, for any interruptions occurring in the current demand to be compensated in a simple manner and by way of simple measures, for example, by means of a simple capacitor or also, where applicable, a freewheeling branch since it is always ensured that one of the load branches is in the freewheeling state for as long as the other load branch is in the state supplied with current.

This may be realized advantageously, in particular, when in the first operating range each of the load branches is switched off with a gap in time prior to any switching on of the respectively other one of the load branches.

One advantageous solution provides for a minimum period of time of, for example, 0.5% of the period duration to be provided in the first operating range between the switching off of each of the load branches and the switching on of the respectively other load branch so that the load branch being switched off is safely switched off when the other load branch is switched on.

Furthermore, the control signals modulated as to pulse width may be varied in the first operating range despite a phase-locked operation of the load branches in that in the first operating range the switch-on time period of the one load branch and the switch-off time period of the other load branch vary relative to the switch-off time period of the one load branch and to the switch-on time period of the other load branch.

The operation of the load branches in the first operating range is, however, possible only until a PWM ratio of approximately 50% is reached.

With a PWM ratio of more than 50%, the conditions explained above may not be realized.

For this reason, it is preferably provided for one of the load branches to be switched on in a second operating range only during the switching off or after the switching off of the other one of the load branches. This procedure enables, at least partially, the switching off of the one load branch and the switching on of the other load branch to be carried out approximately at the same time or at least close in time.

This solution is particularly suitable when a transfer takes place from the first operating state into a second operating state and PWM ratios of more than 50% are used in the second operating state for controlling the load branches.

Another possibility provides for each of the load branches to be switched on in the second operating range after the switching on and prior to the switching off of the respectively other one of the load branches.

Within the meaning of the inventive solution, the switching on or a switching off of a load branch is to be understood, in particular, as a switching on and, therefore, a closing or a switching off and, therefore, an opening of the electronic switch provided in this load branch.

Electronic switches within the meaning of the present invention are, in particular, field effect transistors.

With respect to the possibilities of compensating for fluctuations in the current requirements of the inventive control device which occur despite a suitable choice of the control signals modulated as to pulse width, no further details have so far been given. It is, for example, sufficient in some cases to provide an adequately large capacitor on the input side of the control device to compensate for the fluctuations in voltage and current.

A capacitor of this type is adequate, in particular, when the control signals modulated as to pulse width are shifted in phase with respect to time in such a manner that they are always placed at least in an appreciable control range, in particular, in the range of a PWM ratio of less than 50%, such that the one load branch is switched off when the other load branch is switched on.

A particularly advantageous solution provides, however, for the electronic switch in each load branch to be located between a first connection of the pairs of sliding contacts forming a respective control group and a first voltage connection and for a second connection of the pairs of sliding contacts of the respective control group to be in communication with a second voltage connection, for a freewheeling branch to be provided which has as series connection a capacitor connected to the first voltage connection and an inductor connected to the second connection of the pairs of sliding contacts as well as a freewheeling diode which is located between a central tap between the capacitor and the inductor of the freewheeling branch and the first connection of the pairs of sliding contacts and via which a freewheeling current of the motor winding associated with the pair of sliding contacts flows when an electronic switch is opened.

The advantage of this solution is to be seen in the fact that during the transfer from the state supplied with current into the freewheeling state fluctuations in the supply current flowing to the voltage connections are reduced by the capacitor and the inductor of the freewheeling branch and, in addition, voltage peaks occurring at the electronic switch and at the central tap of the freewheeling branch are evened out and have no or only an inconsiderable effect on the first voltage connection and the second voltage connection and, therefore, the first voltage connection and the second voltage connection are shielded against any undesired voltage peaks.

In principle, it would be conceivable to associate a separate freewheeling branch with each load branch. One particularly favorable solution provides, however, for at least two load branches to be connected in parallel to a freewheeling branch.

It is, however, also conceivable to connect several load branches in parallel to the one freewheeling branch.

Such a connection in parallel of several load branches to one and the same freewheeling branch makes it possible to achieve the inventive advantages with component sizes which are as small as possible and, therefore, savings with respect to the circuitry resources required.

With this solution, in particular, the currents through the capacitor may be reduced and so its service life increases and, in addition, it is possible to use less expensive capacitors.

In this respect, the several load branches are preferably connected in parallel to the freewheeling branch in the same way as a single load branch and so the same conditions result in each load branch.

It is particularly favorable when the at least two load branches have the same circuitry configuration, i.e., in particular, an electronic switch and the pair of sliding contacts connected in series as well as a central tap between them.

In principle, it would not be necessary to configure the electric parameters of the structural elements of the various load branches so as to be identical. It would easily be possible to operate in the load branches with structural elements of different dimensions, for example, it would also be conceivable to provide motor windings with different dimensions.

It is, however, particularly favorable when the motor windings and, therefore, the inductive loads have essentially the same inductance.

In order to keep the undesired voltage peaks at the central tap of the respective load branch as small as possible, it is preferably provided for a first connection of the capacitor of the freewheeling branch to be connected to a first connection of the electronic switch by means of a line, the inductance of which is less than 50 nano henry. With a low-inductive connection of this type, a change in the current through the capacitor may be brought about as quickly as possible.

With respect to the dimensioning of the freewheeling branch, no further details have been given in conjunction with the preceding explanations concerning it. For example, one particularly advantageous embodiment provides for the product of the value of the inductor and the value of the capacitor in the freewheeling branch to be greater than the square of the cycle time of the control signals modulated as to pulse width.

With this dimensioning it is possible for current changes and voltage peaks during the switching off and switching on of the electronic switches to have an effect on the supply voltage connection and the ground connection only to the desired small extent.

In order to bring about a suppression of current changes and voltage peaks which is as good as possible, it is preferably provided for the value of the capacitor of the freewheeling branch to be considerably greater than the product of the maximum value of the current through the motor winding or the motor windings with the cycle time, divided by the voltage between the first voltage connection and the second voltage connection.

In the case of dimensioning, it is to be taken into account that the greater value of the respective maximum possible currents through the motor windings is to be taken into consideration as current through the motor windings in the case of several load branches.

The inventive solution works in all the cases, in which one of the voltage connections is connected to the supply voltage connection and the other one of the voltage connections to the ground connection.

It is, however, particularly favorable, especially for the use of the inventive solution in a motor vehicle, when the first voltage connection is connected to the supply voltage connection and the second voltage connection to the ground connection.

Additional features and advantages of the invention are the subject matter of the following description as well as the drawings illustrating several embodiments.

BRIEF DESCRIPTION OF THE DRAWINGS

FIG. 11 shows an illustration of measurement values for the fourth embodiment at a PWM ratio of 30%;

FIG. 12 shows an illustration of measurement values for the fourth embodiment at a PWM ratio of 50% and FIG. 13 shows an illustration of measurement values of the fourth embodiment at a PWM ratio of 80%.

DETAILED DESCRIPTION OF THE INVENTION

Figure 1:
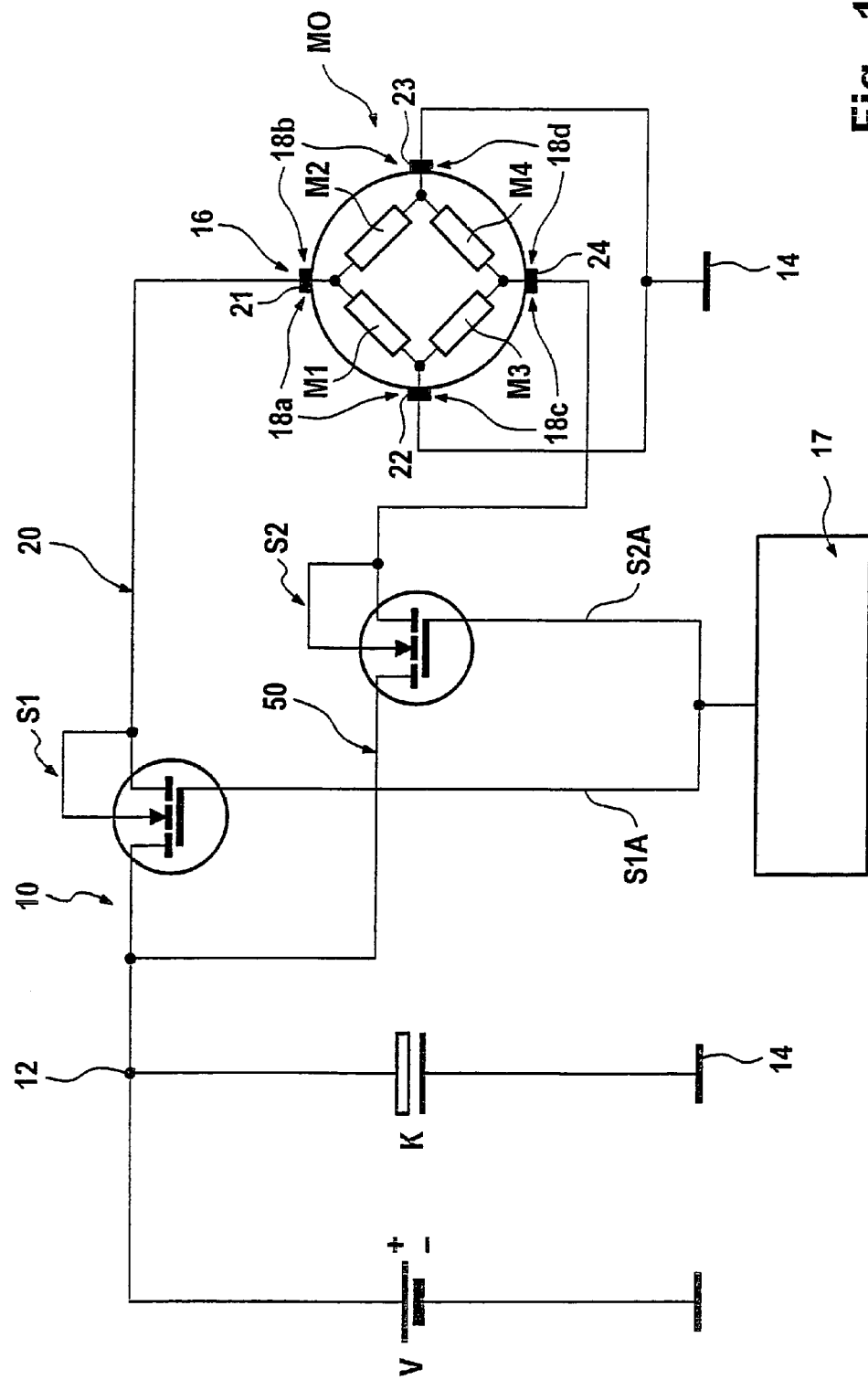
FIG. 1 shows a schematic illustration of a circuit diagram of a first embodiment of an inventive control device.

A first embodiment of an inventive control device illustrated in FIG. 1 comprises a control circuit designated as a whole as 10 for a DC motor MO, with which a fan wheel in a motor vehicle is, for example, driven.

The control circuit 10 comprises a voltage source V which is located between a supply voltage connection 12 and a ground connection 14 of the control circuit 10 and generates a supply voltage U.

With the control circuit 10, individual motor windings M, for example, four motor windings M1, M2, M3, M4 are supplied with current via a commutator 16, comprising, for example, four sliding contacts 21, 22, 23, 24 designed as carbon brushes, of the DC motor MO, wherein in the position of the commutator 16 illustrated in FIG. 1 the motor windings M1 and M2 are supplied with current via a first and a second pair of sliding contacts 18a and 18b, respectively, which form a first control group, and the motor windings M3 and M4 via a third and fourth pair of sliding contacts 18c and 18d, respectively, which form a second control group.

The motor windings M1 to M4 represent primarily inductive loads for the control circuit 10.

In order to activate the motor windings M1 to M4 the control circuit 10 comprises a first load branch 20, in which an electronic switch S1 and the inductive load, i.e., in this case the two motor windings M1 and M2, which are shunt fed, are connected in series, wherein the electronic switch S1 is located between the sliding contact 21 of the pairs of sliding contacts 18a and 18b and the supply voltage connection 12 and the sliding contact 22 of the first pair of sliding contacts 18a as well as the sliding contact 23 of the second pair of sliding contacts 18b are each connected to the ground connection 14 and, consequently, the motor windings M1 and M2 are located between the two sliding contacts 21 and 22 and 21 and 23, respectively.

Furthermore, a second load branch 50 of the control circuit 10 is provided which has an electronic switch S2 which is connected in series to pairs of sliding contacts 18c and 18d which are connected in parallel, wherein the electronic switch S2 is located between the supply voltage connection 12 and the sliding contact 24 of the third and fourth pairs of sliding contacts 18c and 18d whereas the sliding contact 22 of the third pair of sliding contacts 18c and the sliding contact 23 of the fourth are connected to the ground connection 14.

Not only the switch S1 but also the switch S2 of the first load branch 20 and the second load branch 50, respectively, can be activated with control signals S1A and S2A, respectively, which are modulated as to pulse width and can be generated by a modulation stage 17.

Figure 2:
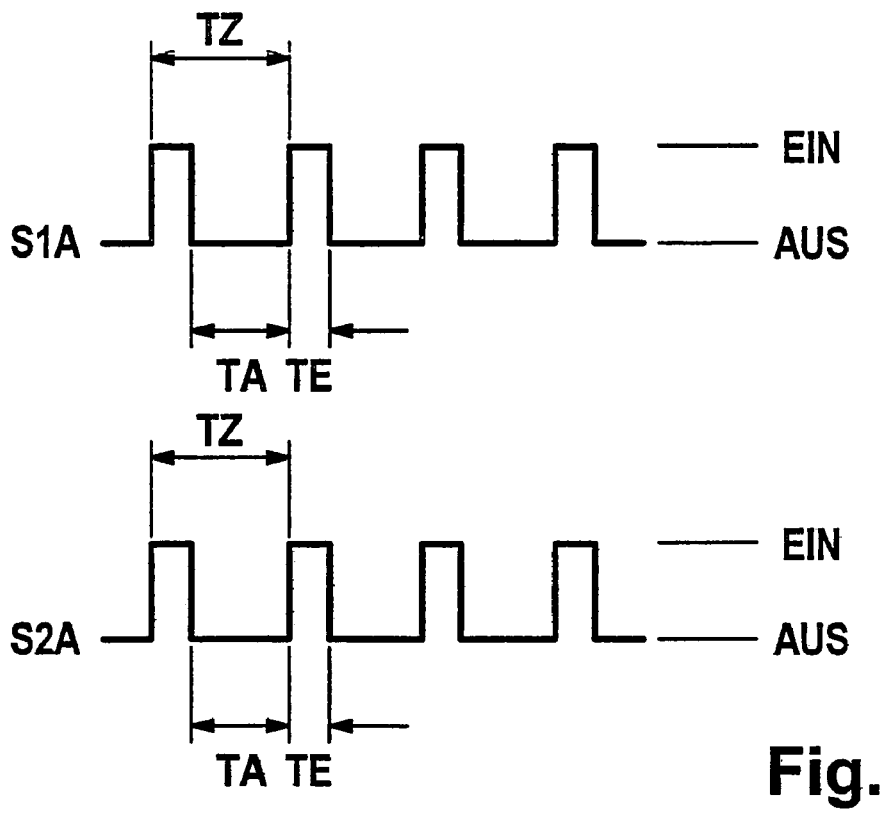
FIG. 2 shows a schematic illustration of the control signals used in the first embodiment.
Figure 4:
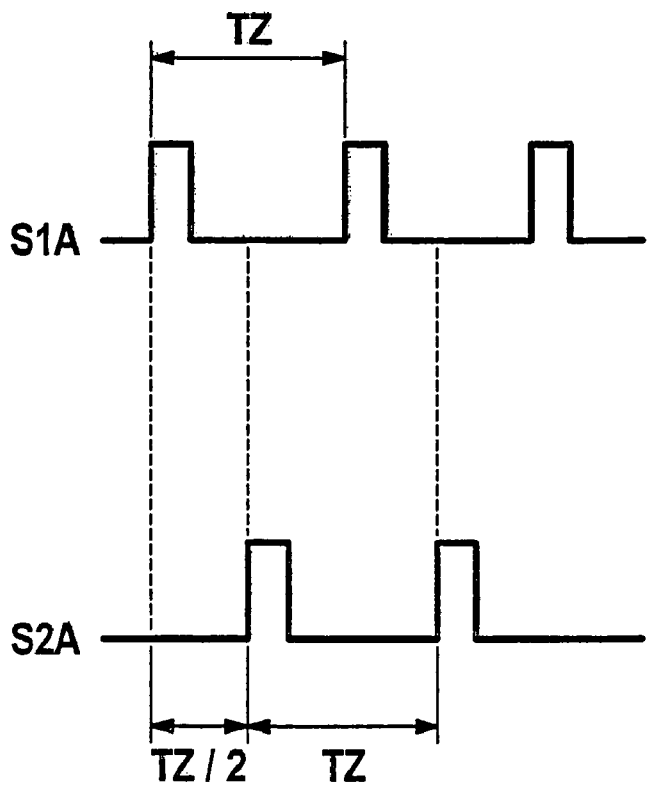
FIG. 4 shows a schematic illustration of the control signals used in the second embodiment of the control device in a first operating range.

In this respect, the control signals S1A and S2A, respectively, which are modulated as to pulse width have period durations or cycle times TZ which, as illustrated in FIG. 2, are preferably identical.

In addition, the switch-off time periods TA and switch-on time periods TE are preferably, as illustrated in FIG. 2, identical for both control signals S1A and S2A.

Since the cycle time TZ is a multiple of the speed of the motor MO, for example, corresponds to at least 100 times, even better at least 300 times, the speed of the motor MO, the effects of the control signals S1A and S2A modulated as to pulse width can be viewed approximately as if the motor windings M1 and M2 and the motor windings M3 and M4 were constantly connected to the pairs of sliding contacts 18a and 18b or 18c and 18d, respectively. Any further rotation of the motor MO results in the motor windings M1 to M4 being connected to the pairs of sliding contacts 18a and 18b or 18c and 18d, respectively, in a different association, wherein all the motor windings normally have in a first approximation the same inductance and, therefore, their connection to the pairs of sliding contacts 18a and 18b as well as 18c and 18d can also be considered in the same way as the connection of the motor windings M1 and M2 as well as M3 and M4.

In one expedient embodiment, the inductance of the motor windings M1 to M4 is selected to be so large that the current is approximately constant with the cycle time TZ selected, for example, TZ~50μ. TZ is, in particular, selected to be so small that the current through the motor windings M1, M2 has no gaps.

To avoid any reactive effects of the parallel switching on of the electronic switches S1 and S2 by the control signals S1A and S2A, a capacitor K is provided between the supply voltage connection 12 and the ground 14 and this is in a position, with a corresponding size, to smooth out, at least partially, the flow of current from the voltage source V to the supply voltage connection 12 and from the ground connection 14.

Figure 3:
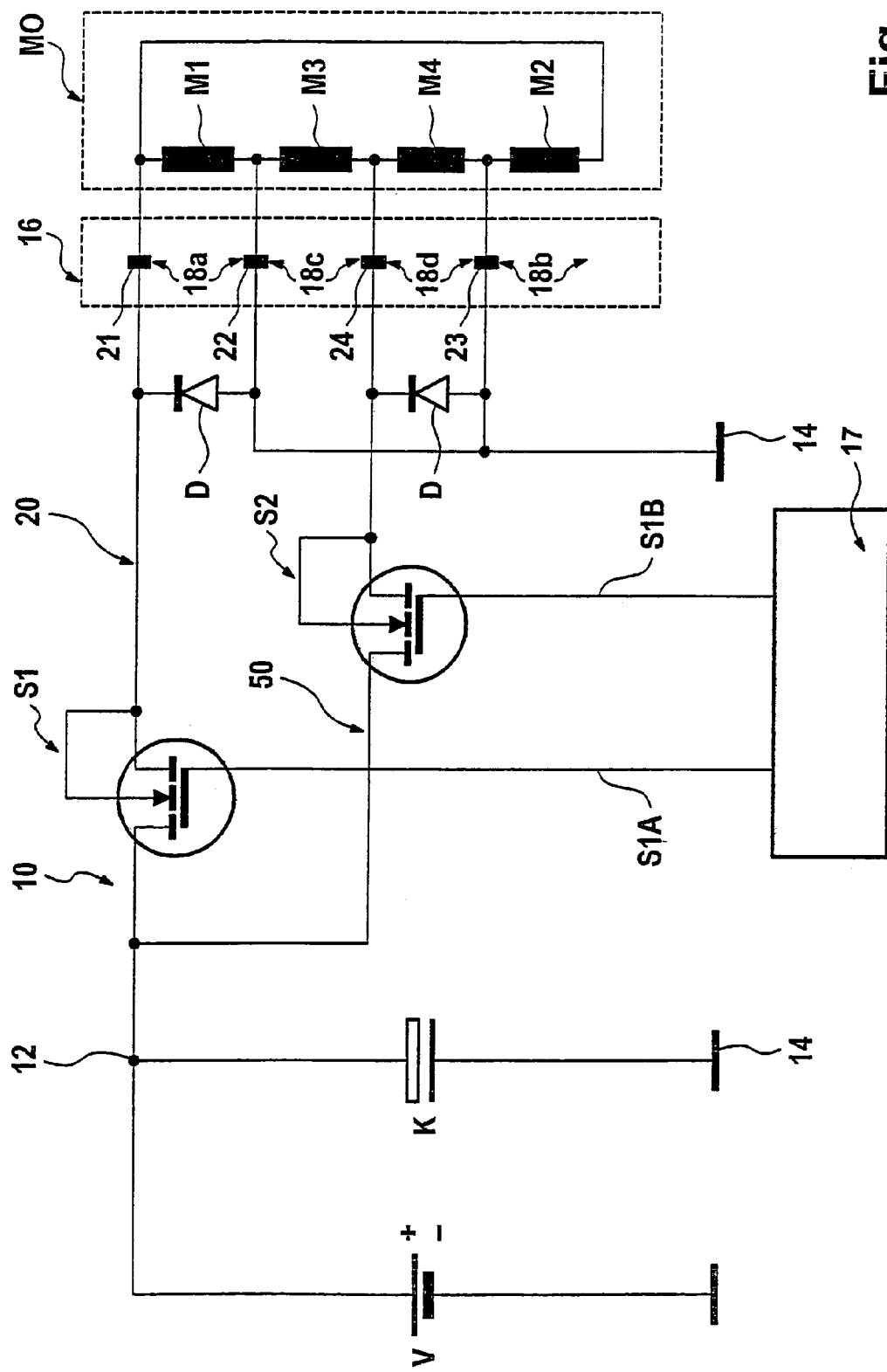
FIG. 3 shows a schematic illustration of a circuit diagram of a second embodiment of an inventive control device.
Figure 5:
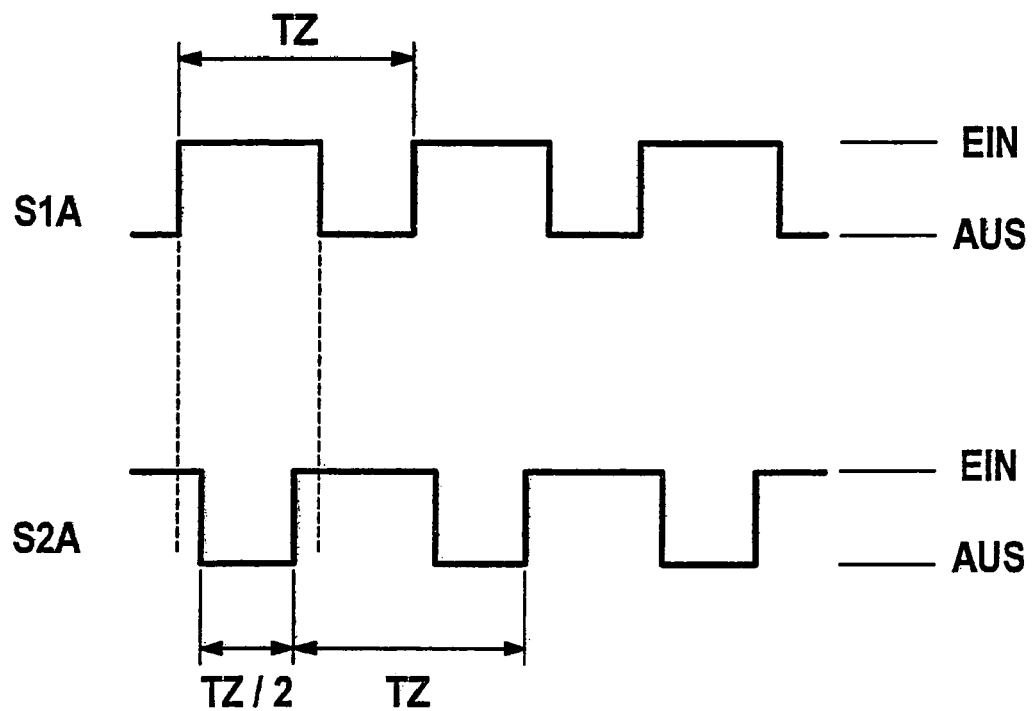
FIG. 5 shows a schematic illustration of the control signals used in the second embodiment of the inventive control device in a second operating range.

In a second embodiment, illustrated in FIG. 3, the motor MO is illustrated by means of an equivalent circuit diagram, comprising, for example, the four motor windings M1 to M4, wherein the commutator 16, likewise illustrated by an equivalent circuit diagram, is in the same position as in the first embodiment and so the motor winding M1 is connected to the pair of sliding contacts 18a and the motor winding M2 to the pair of sliding contacts 18b, the motor winding M3 to the pair of sliding contacts 18c and the motor winding M4 to the pair of sliding contacts 18d and the pairs of sliding contacts 18a and 18b form the first control group and the pairs of sliding contacts 18c and 18d the second control group.

In addition, a respective freewheeling diode D is connected in parallel to the pairs of sliding contacts 18a and 18b connected in parallel and the pairs of sliding contacts 18c and 18d in order to protect the electronic switches S1, S2 provided in the respective load branches 20, 50 and this diode takes over the freewheeling current when the respective electronic switch S1, S2 is switched off.

In the second embodiment, the modulation stage operates such that the first control signal S1A and the second control signal S2A have the same cycle time TZ but the control signals S1A and S2A are shifted in phase, for example, the shift in phase is selected such that the control signals S1A and S2A are shifted in phase by the cycle time TZ/2 relative to one another.

Furthermore, the switch-on time period TE and the switch-off time period TA are still the same for the sake of simplicity, wherein the switch-on time period TE and the switch-off time period TA vary relative to one another depending on the desired speed.

With this shift in phase of the control signals S1A and S2A relative to one another it is possible to switch on the one load branch, for example, the first load branch 20, at least up to a PWM ratio of 50%, when the other load branch, for example, the load branch 50 is switched off so that the other load branch is always switched off during the times, in which the one load branch draws current from the voltage source, whereas the other load branch draws current from the voltage source when the one load branch is switched off.

As a result, it is possible for the capacitor K between the supply voltage connection 12 and the ground connection 14 to have smaller dimensions since this has merely to balance out smaller fluctuations in current.

Since it is possible in the range of the pulse width modulation up to a PWM ratio of 50% to always switch on the one load branch when the other load branch is switched off, the shift in phase of TZ/2 between the first control signal S1A and S2A is maintained in this range which is designated as first operating range of the control circuit.

If, however, the PWM ratio exceeds the value of 50%, the shift in phase between the first control signal and the second control signal is advantageously determined at a value of less than TZ/2 so that the one control signal S1A is always switched on and switched off when the other control signal is switched on so that a current demand from the voltage source V which is temporarily increased occurs but this is balanced out by the capacitor K in a simple manner.

Figure 6:
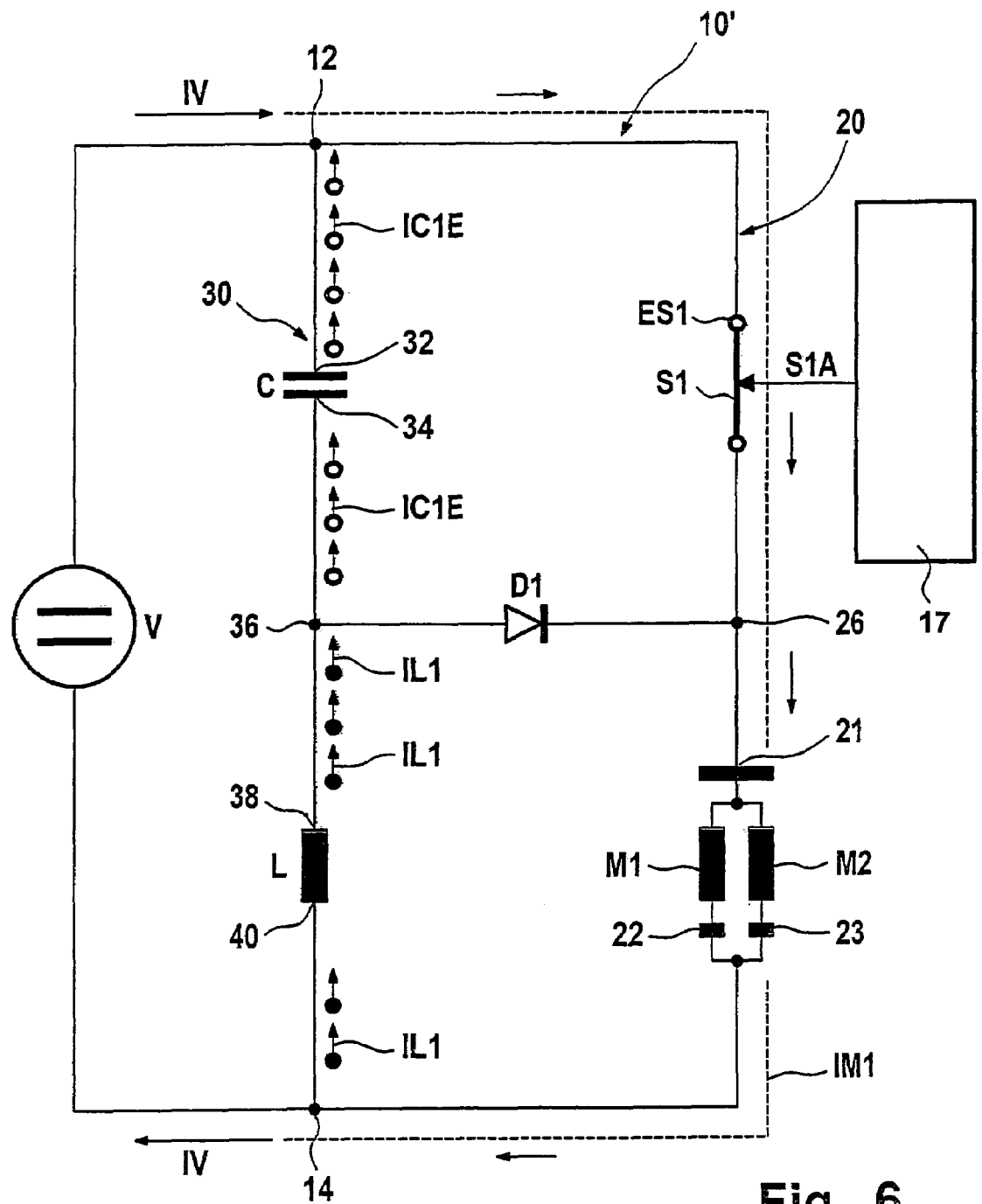
FIG. 6 shows a schematic illustration of a section from the circuit diagram of a third embodiment of an inventive control device, wherein the section shows only the first load branch in a state supplied with current.

A third embodiment of an inventive control device comprises a control circuit 10' which has, for the respective pairs of sliding contacts combined to form a control group in accordance with FIG. 1, for example, the pairs of sliding contacts 18a and 18b and the motor windings associated with them which are connected in parallel and represent an inductive load, for example, the motor windings M1 and M2 illustrated in FIG. 6, the corresponding load branch, in this example the first load branch 20, in which the electronic switch S1 and the inductive load, in this case the motor windings M1 and M2, are connected in series, wherein the electronic switch S1 is located between the sliding contact 21 of the inductive load, formed by M1 and M2, and the supply voltage connection 12 and, in this respect, is connected to the supply voltage connection 12 with a first connection ES1 and the sliding contacts 22 and 23, which provide the connection to the inductive load M1 and M2, are connected to the ground connection 14.

The third embodiment, as well, proceeds by way of example from a relative position of the commutator 16 in relation to the motor MO which corresponds to that of the first and second embodiments according to FIGS. 1 and 3.

Furthermore, the sliding contact 21 of the inductive load M1 and M2 is connected to a central tap 26 of the first load branch 20.

In addition, the inventive control circuit 10' comprises for each of the load branches, in this case for the first load branch 20, a freewheeling branch 30, in which a capacitor C and an inductor L are connected in series, wherein a first connection 32 of the capacitor C is connected to the supply voltage connection 12 and a second connection 34 of the capacitor C is connected to a central tap 36 of the freewheeling branch 30 which, for its part, is again connected to a first connection 38 of the inductor L which is connected via a second connection 40 to the ground connection 14.

Furthermore, a freewheeling diode D1 of the freewheeling branch 30 is located between the central tap 36 of the freewheeling branch 30 and the central tap 26 of the first load branch 20 and its flow-through direction is selected such that it allows a current to flow from the central tap 36 to the central tap 26 but blocks it in the reverse direction.

The electronic switch S1 can be controlled, in addition, by means of the control signal S1A which is modulated as to pulse width and is generated by a modulation stage 17 in accordance with the power of the motor MO required and with a predetermined cycle time TZ.

The inventive control circuit 10' in accordance with the third embodiment operates as follows:

If the electronic switch 51 is closed by the control signal S1A modulated as to pulse width, a current IM1 designated by arrows with a dotted line flows from the supply voltage connection 12 via the first electronic switch S1, the central tap 26 and the motor winding M1 to the ground connection 14 for operating the motor windings M1 and M2 during a current supply time TS.

The current IM1 through the motor winding M1 is the sum of the partial currents IV and IC1E uniting at the supply voltage connection 12, wherein the voltage source V supplies the partial current IV and the partial current IC1E flows as a result of a discharge of the capacitor C from its first connection 32 in the direction of the supply voltage connection 12.

Furthermore, a current IL1 flows from the ground connection 14 through the inductor L, namely in the direction of the central tap 36 and from the central tap 36 as current IC1E to the second connection 34 of the capacitor C so that the current IM1 is divided at the ground connection 14, wherein the partial current IV flows to the voltage source V whereas the partial current IL1 flows through the inductor L to the capacitor C, wherein IC1E and IL1 are, in this case, of the same size.

Figure 7:
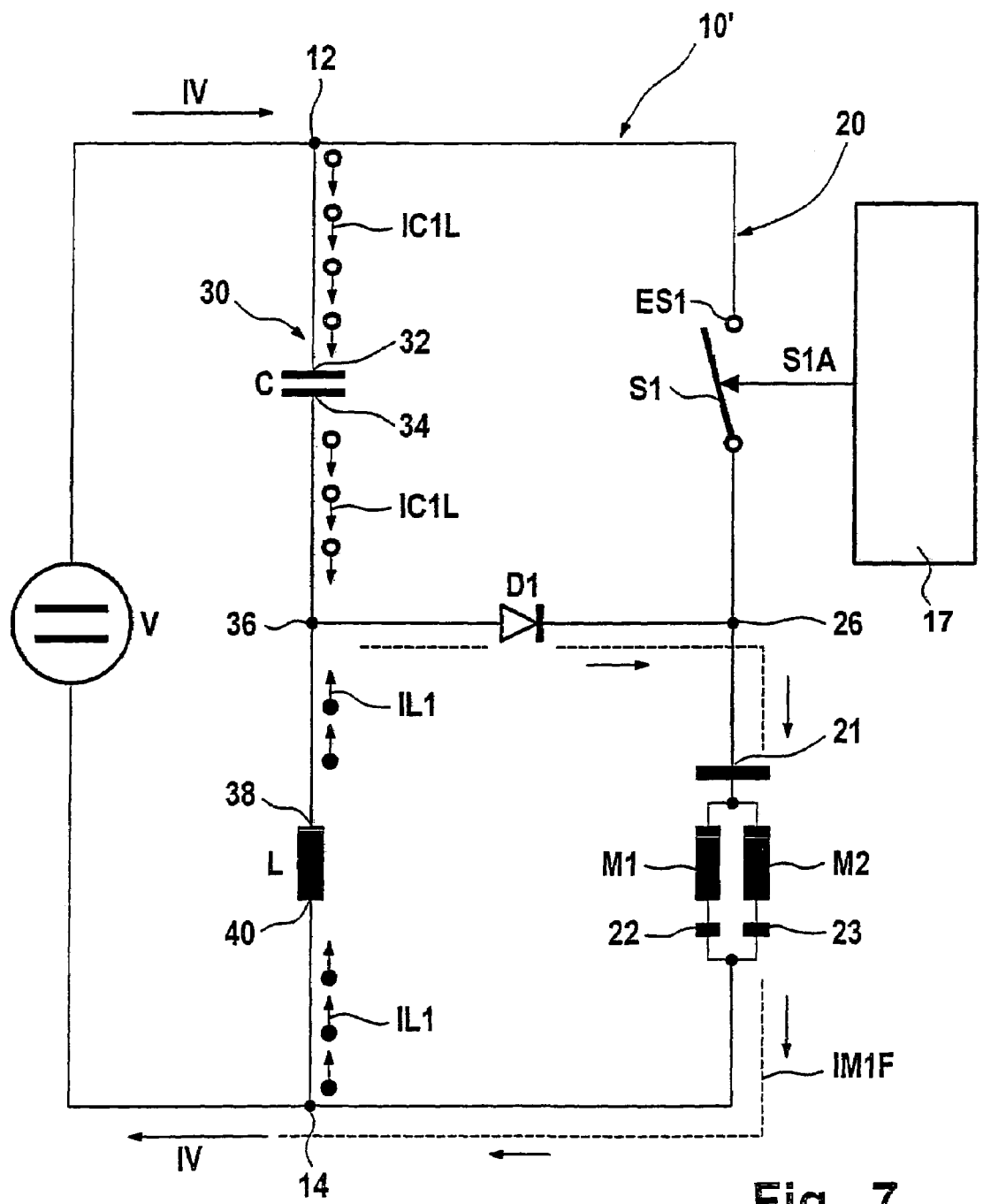
FIG. 7 shows the circuit diagram of the third embodiment according to FIG. 6 in the freewheeling state of the first load branch.

If, on the other hand, as illustrated in FIG. 7, the switch S1 is opened by the control signal S1A, current no longer flows from the supply voltage connection 12 via the electronic switch S1 and the motor winding M1 is operated in the freewheeling state for the duration of a freewheeling time TF. During this time, a current IC1L flowing in the opposite direction to the current IC1E flows from the supply voltage connection 12 to the first connection 32 of the capacitor C and charges this, wherein the current IC1L corresponds to the current IV which flows from the voltage source V to the supply voltage connection 12. In this respect, the current IV is approximately of the same size during the current supply period TS and the freewheeling period.

Furthermore, the current IC1L flows from the second connection 34 of the capacitor C to the central tap 36.

In the freewheeling state, a current IM1F flows from the central tap 36 via the diode D1 to the central tap 26 of the first load branch 20 and from this via the motor winding M1 to the ground connection 14.

This current IM1F is formed by two partial currents, namely as first partial current the current IC1L which results due to charging of the capacitor C and, on the other hand, by the current IL1 which still flows through the inductor L to the central tap 36 of the freewheeling branch 30.

Furthermore, the current IM1 is again divided at the ground connection 14 into the current IL1 which flows to the second connection 40 of the inductor L and through this as well as a current IV which flows back to the voltage source V.

In this state, the current IV is equal to the current IC1L, wherein the current IC1L would, theoretically, flow for such a time until the capacitor C is charged.

The advantageous effects of the freewheeling branch 30 may be achieved with the following dimensionings of the capacitor C and the inductor L.

$$L \cdot C \gg (TZ)^2 \quad (1)$$

$$C > (\text{maximum value IM1}) \cdot \frac{TZ}{U} \cdot 10 \quad (2)$$

The second load branch 50 is designed identically to the first load branch 20 for operating the motor windings M3 and M4 and the freewheeling branch 30 is likewise associated with the second load branch 50.

Figure 8:
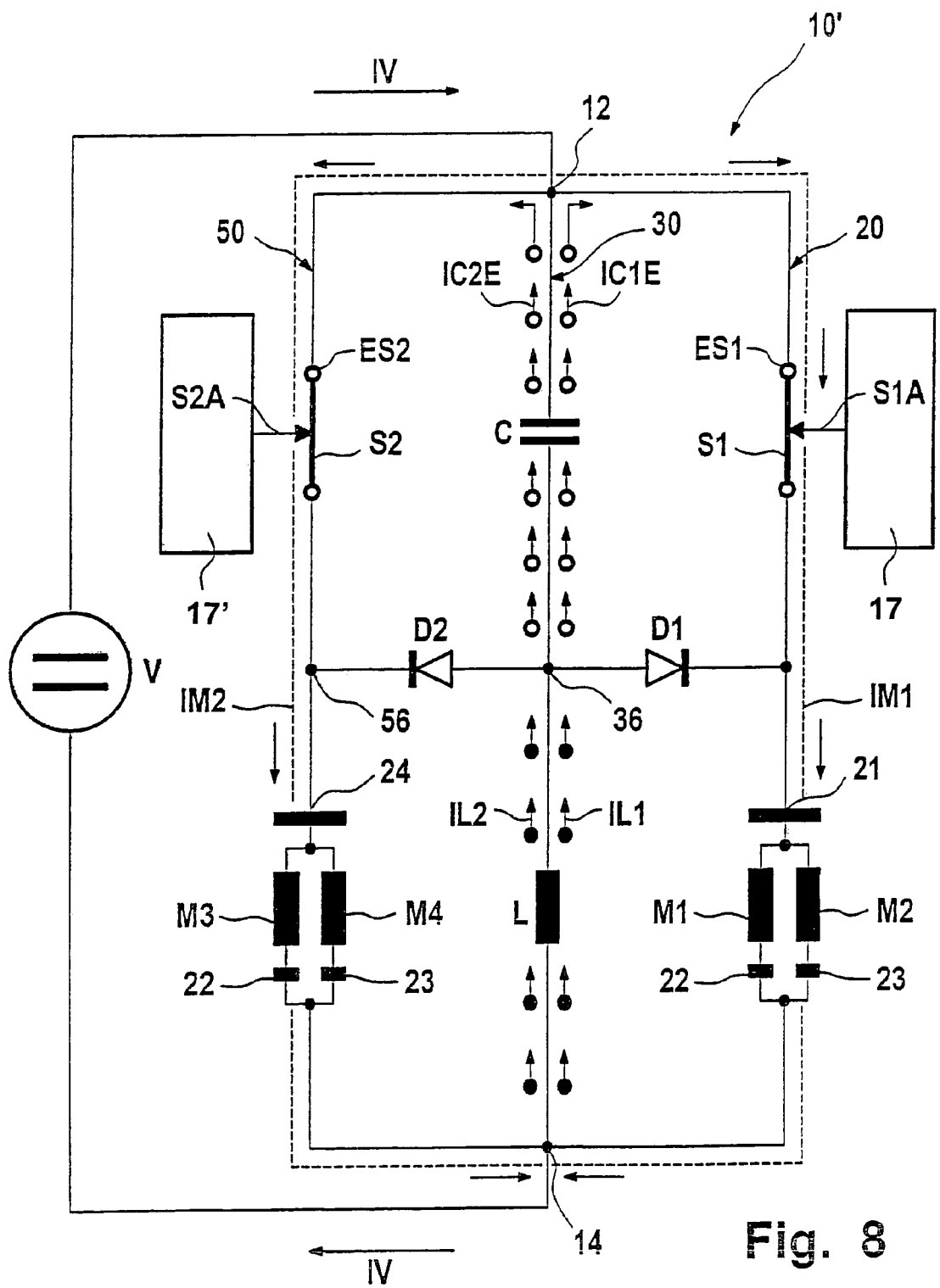
FIG. 8 shows a schematic illustration of a circuit diagram of a fourth embodiment of an inventive control device with a freewheeling branch and two load branches which are both in the state supplied with current.
Figure 9:
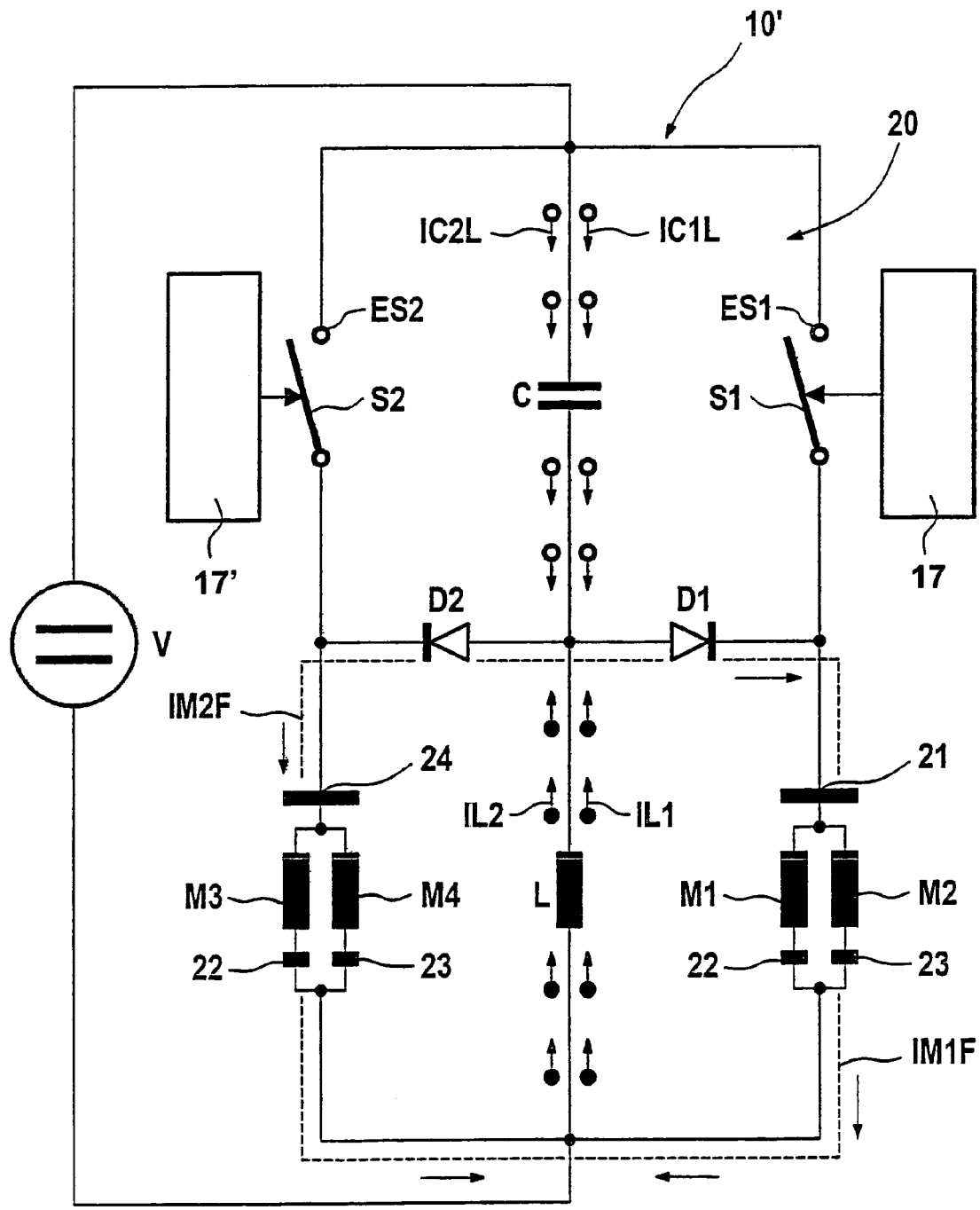
FIG. 9 shows the circuit diagram of the fourth embodiment in the freewheeling state of both load branches.
Figure 10:
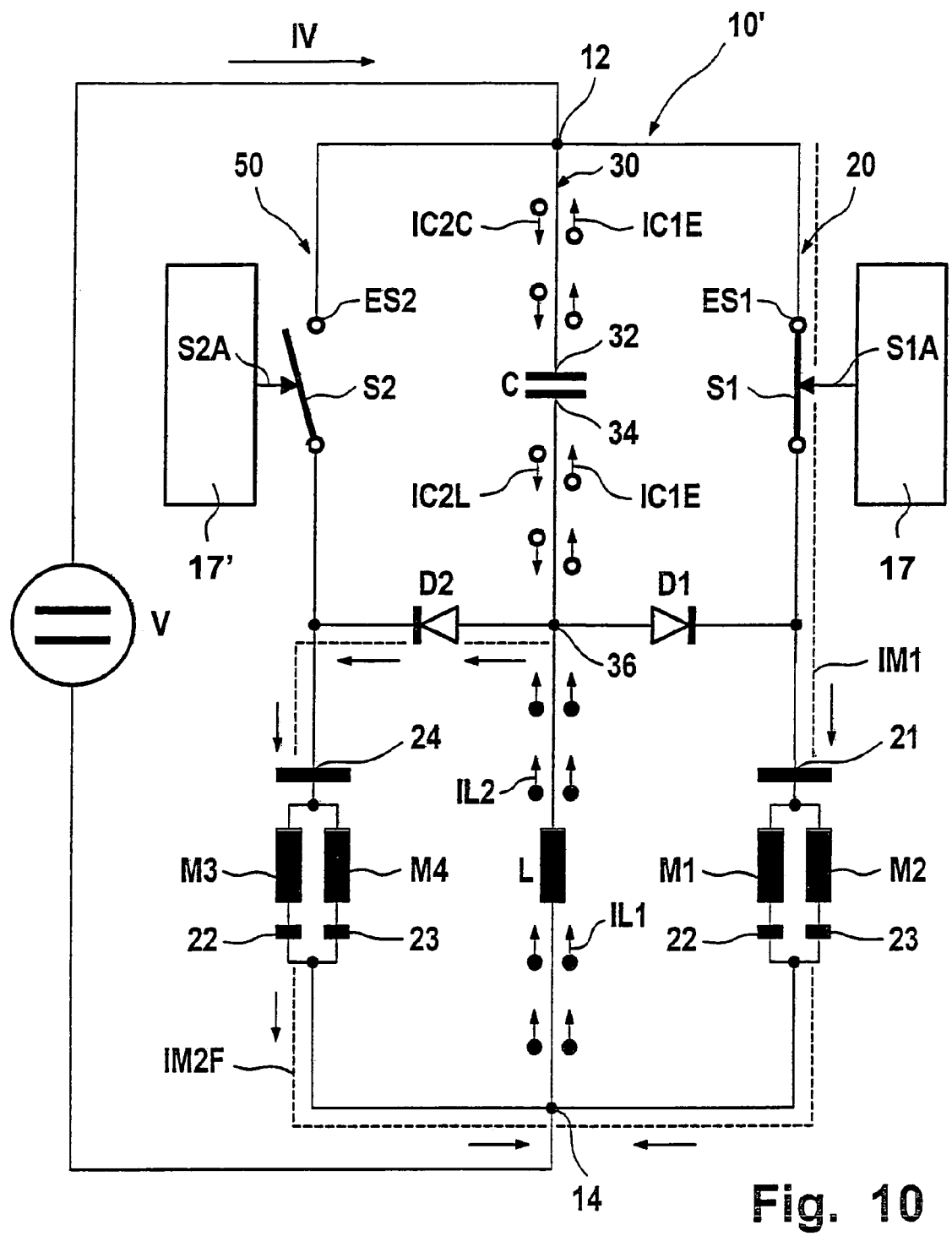
FIG. 10 shows the circuit diagram of the fourth embodiment in the freewheeling state of the second load branch and in the state supplied with current of the first load branch.

In a fourth embodiment of an inventive control circuit 10", illustrated in FIGS. 8 to 10, the motor MO and the commutator 16 are in the same position relative to one another as illustrated in the first and second embodiments according to FIGS. 1 and 3 and the description proceeds by way of example from this state. Furthermore, not only the first load branch 20, which is designed in the same way as in the third embodiment, to which reference is made, is illustrated between the supply voltage connection 12 and the ground connection 14 but also the second load branch 50 which is designed similar to the first load branch 20 and is likewise connected in parallel to the same freewheeling branch 30'. Therefore, the second load branch 50 likewise comprises the electronic switch S2 which is connected in series to an inductive load, namely the motor windings M3 and M4, wherein the electronic switch S2 is located between the supply voltage connection 12 and a sliding contact 24 for the motor windings M3 and M4 and, in this respect, is connected to the supply voltage connection 12 with a first connection ES1 and the sliding contacts 22 and 23 for the motor windings M3 and M4 are connected to the ground connection 14.

Furthermore, the second load branch 50 is provided with a central tap 56, wherein a diode D2 is provided between the central tap 56 and the central tap 36 of the freewheeling branch 30', the freewheeling branch 30' being supplemented by this diode, wherein the diode D2 is connected with its flow-through direction such that it allows a current to flow from the central tap 36 to the central tap 56 but blocks it in a reverse direction.

Furthermore, the electronic switch S2 can be controlled by the modulation stage 17' by means of the control signal S2A modulated as to pulse width, wherein the control signal S2A preferably has the same cycle time TZ as the control signal S1A.

For reasons of the clarity of the circuit, in particular, also with a view to the currents flowing, the sliding contacts 22 and 23 are illustrated twice although the commutator 16 is actually designed in the same way as that illustrated in FIGS. 1 and 3.

For the dimensioning of the capacitor C, the following applies for the second embodiment $$C > (\text{maximum value IM1, IM2}) \frac{TZ}{U} \cdot 10,$$

wherein the value to be used for the (maximum value IM1, IM2) is that which corresponds to the greatest maximum current through the inductive load in the load branches 20, 50.

If the two switches S1 and S2 are closed in the fourth embodiment of the inventive control circuit 10', the current IM1 flows analogously to the third embodiment via the motor windings M1 and M2 connected in parallel and the current IM2 via the motor windings M3 and M4 connected in parallel, wherein the currents IM1 and IM2 are each formed from two partial currents, of which one is supplied by the current IV supplied by the voltage source V and the other partial current by the currents IC1E and IC2E, respectively, which result during the discharge of the capacitor C, wherein the partial current IC1E contributes to the current IM1 through the motor windings M1 and M2 and the partial current IC2E to the current IM2 through the motor windings M3 and M4.

Furthermore, in accordance with the case of the first embodiment illustrated in FIG. 1 the currents IL1 and IL2 also flow through the inductor L in the second embodiment illustrated in FIG. 3, wherein the currents IL1 and IL2 correspond to the currents IC1E and IC2E.

Furthermore, the currents IM1 and IM2 are again divided at the ground connection 14 into the partial currents IL1 and IL2, respectively, as well as additional partial currents which result in the current IV flowing to the voltage source V.

If, as illustrated in FIG. 9, both switches S1 and S2 are switched off, conditions result which correspond to those of the second embodiment, illustrated in FIG. 7. This means that the freewheeling currents IM1F and IM2F, which each represent the sum of the currents IC1L and IC2L, respectively, as well as IL1 and IL2, flow through the respective motor windings M1 and M2 as well as M3 and M4, analogous to the freewheeling state of the first embodiment, illustrated and described in FIG. 7.

The fourth embodiment of the inventive control device with the control circuit 10" can, however, be operated in an additional state, as illustrated in FIG. 10, namely in a state, in which the electronic switch S1 is, for example, closed and the electronic switch S2 opened.

In this case, the current IM1 flows in the first load branch 20 through the motor windings M1 and M2 analogous to the case illustrated in FIGS. 6 and 8 whereas in the second load branch 50 the freewheeling state is present on account of the opened switch S2 and so the current IM2F flows in this, analogous to FIGS. 7 and 9.

This leads in the freewheeling branch 30 to the fact that the current IC1E flows in accordance with the state of the first load branch 20 from the first connection 32 of the capacitor C to the supply voltage connection 12 in order, as partial current, to form the current IM1 with an additional partial current of the current IV, wherein the current IL1 also flows through the inductor L on account of the current IM1 through the first load branch 20.

On the other hand, the second load branch 50 is in the freewheeling state which means that a current IC2L flows from the second connection 34 of the capacitor C to the central tap 36 and, in addition, a current IC2L flows from the supply voltage connection 12 to the first connection 34 of the capacitor C, wherein the capacitor C is charged by the current IC2L.

Furthermore, the freewheeling state in the second load branch 50 leads to the fact that as a result of the inductor L the current IL2 leads from the base connection 14 to the central tap 36 and is added to the current IC2L to form the current IM2F which flows through the second motor winding M2.

As shown by a comparison of the directions of the currents IC1E and IC2L, these flow in opposite directions to one another and so they cancel one another out at least partially and so a resulting current either discharges or charges the capacitor C depending on whether the current IC1E or the current IC2L predominates, wherein this resulting current is smaller than the amounts of the currents IC1E and IC2L.

In addition, it is clearly apparent in the case of the switching state of the fourth embodiment according to FIG. 10 that the currents IL1 and IL2, as also results from the switching states according to FIG. 8 and FIG. 9, retain their direction at least and can fluctuate only as to their amount whereas it is shown in a comparison of the currents IC1E or IC2E and IC1L or IC2L that these alter their direction depending on which of the motor windings M1 and M2 and/or M3 and M4 is in the freewheeling state, wherein in the case where some of the motor windings, namely the motor windings M1 and M2, are in the state supplied with current and the other ones of the motor windings, namely the motor windings M3 and M4, are in the freewheeling state the currents IC1E and IC2L cancel one another out at least partially and so in total only a slight discharging or charging current flows to the capacitor.

In addition, the freewheeling branch 30 ensures that the current IV flowing from the voltage source V is not essentially interrupted irrespective of the position of the electronic switches S1 or S2 and, therefore, always continues to flow and, at the most, fluctuates as to its amount.

Since the currents IC1E and IC2L cancel one another out at least partially when, according to FIG. 10, some of the motor windings M1, M2, M3, M4, for example, the motor windings M1 and M2 are in the state supplied with current and the other ones of the motor windings, for example, the motor windings M3 and M4 are not in the state supplied with current, the load on the freewheeling branch 30 is minimal when the occurrence of such a state is aimed for during periods within the cycle time TZ which are as long as possible.

The modulation stages 17, 17' preferably operate such that their cycle time TZ is identical.

Furthermore, it is preferably provided for the control signals S1A and 52A modulated as to pulse width not only to have the same cycle times TZ but also to be phase-locked relative to one another in order to take into account the state that some of the motor windings M1, M2, M3, M4, for example, the motor windings M1 and M2 are in the state supplied with current whereas the other ones of the motor windings M1, M2, M3, M4, for example, the motor windings M3 and M4 are in the freewheeling state. For this reason, with a control signal S1A modulated as to pulse width the control signal S2A modulated as to pulse width is formed so as to be phase-locked, namely such that its switch-on time period TE1 corresponding to the current supply time TS falls into a switch-off time period TA2 of the control signal S2A corresponding to the freewheeling time TF whereas, on the other hand, a switch-on time period TE2 is such that this falls into a switch-off time period TA1 of the first control signal S1A modulated as to pulse width.

The electronic switches S1 and S2 are closed in accordance with the first control signal S1A or the second control signal S2A in the periods TE1 and TE2, respectively, and opened in the periods TA1 and TA2, respectively.

Accordingly, the currents IM1 and IM2 are formed due to the motor windings M1 and M2 or M3 and M4, as illustrated in FIGS. 11c and d, respectively, wherein different sizes of the motor windings M1 and M2 and M3 and M4, which lead to different currents IM1 and IM2, have been assumed merely for the sake of a clearer illustration of the relationships but the motor windings M1, M2, M3, M4 are normally of an identical design.

Furthermore, a current IL1 plus IL2 results therefrom, as illustrated in FIG. 11e, due to the inductor L and this is essentially constant over the time whereas the current IC1 plus IC2, as illustrated in FIG. 11f, fluctuates.

Finally, FIG. 11h shows that during the transition from the freewheeling state to the state supplied with current voltage peaks of the voltage U36 can occur at the central tap 36. These voltage peaks have their cause in a freewheeling capacitor which is not ideal and has a longitudinal inductance which is not to be ignored and leads to the fact that the current cannot alter suddenly due to the capacitor C and, therefore, voltage peaks occur at the central tap 36 in comparison with the ground connection 14.

These voltage peaks may be kept small due to a connection of the first connection 32 of the capacitor C to the switches S1, S2 and of the second connection 34 to the diodes D1, D2 which has an inductance of less than 50 nano henry.

These voltage peaks also do not have any effect on the supply voltage connection 12 or the ground connection 14 since these are shielded in relation to the central tap 36 by the capacitor C and the inductor L, respectively. Therefore, the current IV which flows from the voltage source V to the supply voltage connection 12 and from the ground connection 14 to the voltage source V is essentially constant, as is apparent from FIG. 11g.

Furthermore, it is to be noted in FIG. 11h that the change in the voltage at the capacitor C is small during a cycle time TZ, preferably less than 50 mV which can be achieved by means of a big capacitor C of, for example, $$C > 30 \text{ (maximum value IM1, IM2)} \frac{TZ}{U}.$$

If the pulse width modulation is now changed, i.e., the switch-off time period TA1 is altered in favor of the switch-on time period TE1, only a shifting of a switch-off flank AF1 of the first control signal S1A preferably takes place whereas a switch-on flank EF1 is not shifted.

On the other hand, the switch-on flank EF2 in the case of the second control signal S2A is shifted whereas the switch-off flank AF2 remains unchanged.

Finally, the first control signal S1A and the second control signal S2A are synchronized in such a manner that the switch-on flank EF1 and the switch-off flank AF2 are in constant phase relationship relative to one another, for example, follow one another in time at such an interval that the switch-off flank AF2 has just reached the value zero when the switch-on flank EF1 deviates from the value zero to higher values.

As a result, a preset phase relationship is predetermined by the switch-on flank EF1 and the switch-off flank AF2 and this always ensures that the respective switch-on time period TE1 or TE2 of the one control signal S1A and S2A, respectively, occurs when the switch-off time period TA2 and TA1, respectively, is present in the case of the other control signal S2A and S1A, respectively.

This is possible for such a time until a PWM ratio of almost 50% is reached since, in the case of an identical cycle time TZ predetermined for the first control signal S1A and the second control signal S2A, it is then no longer possible for the switch-on time period of the one control signal S1A or S2A to coincide with the switch-off time period of the other control signal S2A and S1A, respectively.

If, on the other hand, a PWM ratio of approximately 50% is reached, as illustrated, for example, in FIG. 12, a temporary overlapping of the control signals S1A and S2A cannot be avoided, for example, in the range of the switch-off flank AF1 and the switch-on flank EF2.

As a result, a state which is illustrated in FIG. 8 is reached for a short period of time on account of the overlapping in time of the switch-on flank EF2 with the closed state of the electronic switch S1A as far as the switch-off flank AF1 of the first control signal S1A whereas between the switch-off flank AF2 and the switch-on flank EF1 a state is present which is illustrated in FIG. 9, i.e., a state, with which both electronic switches S1, S2 are opened.

This has an effect in this way which is clearly apparent in the sum of the currents IC1 plus IC2, as illustrated in FIG. 12f.

On the other hand, the effect on the motor currents IM1 and IM2 in a comparison with the ratios in the case of a pulse width modulation of 30% is similar at least qualitatively (FIGS. 12c, 12d).

If, on the other hand, the control signals S1A and S2A have PWM ratios of approximately 80%, the switch-on time period TE1 and TE2 predominates over the corresponding switch-off time period TA1 and TA2, respectively (FIGS. 13a, 13b). In this case, it is no longer possible for the two control signals S1A and S2A to be arranged relative to one another in time such that the switch-on time periods TE1 and TE2 overlap as little as possible, wherein the rigid phase relationship between the switch-off flank AF2 of the second control signal S2A and the switch-on flank EF1 of the first control signal is maintained.

Between the time $t_1$ and the time $t_2$, conditions are, therefore, present in the case of the second embodiment in the state according to FIG. 10, i.e., some of the motor windings M1, M2, M3, M4 are in the state supplied with current whereas the others are in the freewheeling state (FIGS. 13a, 13b).

Between the time $t_2$ and the time $t_3$, conditions are present in accordance with FIG. 8, i.e., all the motor windings M1, M2, M3, M4 are in the state supplied with current.

Between the times $t_3$ to $t_4$ and $t_4$ to $t_5$, conditions are likewise present in accordance with FIG. 10, i.e., some of the motor windings M1, M2, M3, M4 are in the state supplied with current and the others in the freewheeling state.

Consequently, in the fourth embodiment at a pulse width modulation of more than 80%, switching states essentially occur according to FIG. 8 and according to FIG. 10 whereas switching states according to FIG. 9 of the fourth embodiment do not occur.

At PWM ratios of approximately 80%, the currents IM1 and IM2 are considerably greater than at the PWM ratios of less than 80% (FIGS. 13c and 13d). At PWM ratios of between 80% and 100%, the currents IM1 and IM2 are greater.

In addition, the current IL1 plus IL2 reaches its maximum at the pulse width modulation of 50% (FIGS. 13e and 13f).

With the sum of the currents IC1 and ICL, fluctuations occur, as illustrated in FIG. 13f, depending on which of the motor windings M1, M2, M3, M4 are in the state supplied with current or in the freewheeling state.

Moreover, the current IV from the voltage source V to the supply voltage connection 12 and from the ground connection 14 to the voltage source V is also essentially constant in this case (FIG. 13g).

The invention claimed is:

1. Control device for a DC motor, comprising:
a modulation stage generating control signals modulated as to pulse width with a clock frequency substantially above motor speed, and
a control circuit controlled by at least one control signal and having at least two load branches, each of said load branches being provided with an electronic switch controlled by one of the control signals modulated as to pulse width,
a commutator having at least four sliding contacts,
at least four windings, each of said windings being commutatively arranged between one of said sliding contacts and a next following sliding contact, alternate ones of said sliding contacts forming a respective control group with a next following sliding contact and with a preceding sliding contact,
each of said load branches being associated with one of said control groups for controlling power feed to the windings associated with said respective one control group via the sliding contacts of said respective control group.

2. Control device as defined in claim 1, wherein each load branch comprises a freewheeling component and an electronic switch connected in series to the pairs of sliding contacts.

3. Control device as defined in claim 1, wherein the modulation stage generates a separate control signal modulated as to pulse width for each of the load branches.

4. Control device as defined in claim 3, wherein the control signals are shifted in phase relative to one another.

5. Control device as defined in claim 1, wherein the control signals have the same period duration.

6. Control device as defined in claim 1, wherein the control signals have an identical pulse width modulation for the load branches.

7. Control device as defined in claim 1, wherein the control signals are phase-locked in relation to one another.

8. Control device as defined in claim 1, wherein a switch-on time period of one of the load branches and a switch-off time period of the other one of the load branches are predetermined relative to one another and that a time interval between the switch-on time period of the one of the load branches and a switch-on time period of the other one of the load branches varies in accordance with the value of the PWM ratio to be set.

9. Control device as defined in claim 1, wherein a control of the at least two load branches is brought about such that one of the load branches is switched on when the other one of the load branches is switched off.

10. Control device as defined in claim 1, wherein in a first operating range each of the load branches is switched on only when the respectively other one of the load branches is switched off.

11. Control device as defined in claim 10, wherein in the first operating range each of the load branches is switched off with a gap in time prior to any switching on of the respectively other one of the load branches.

12. Control device as defined in claim 11, wherein in the first operating range a minimum period of time of 0.5% of a period duration is provided between the switching off of each of the load branches and the switching on of the respectively other one of the load branches.

13. Control device as defined in claim 10, wherein in the first operating range a switch-on time period of the one load branch and a switch-off time period of the other load branch vary.

14. Control device as defined in claim 1, wherein in a second operating range one of the load branches is switched on only during a switching off or after the switching off of the other one of the load branches.

15. Control device as defined in claim 1, wherein the control circuit has a capacitor arranged on a supply side of the load branches.

16. Control device for DC motors comprising:
a commutator for feeding motor windings of said DC motor, said commutator having at least four sliding contacts, the sliding contacts being combined to form at least two control groups, the sliding contacts being combined within each control group to form pairs of sliding contacts fed in parallel,
a modulation stage generating at least one control signal modulated as to pulse width with a clock frequency substantially above a motor speed, and
a control circuit controlled by the at least one control signal and having at least two load branches, each load branch being provided with an electronic switch controlled by the control signal modulated as to pulse width and feeding in parallel said pairs of sliding contacts of one of said control groups, said control circuit operating in a first and a second operating range,
wherein in the second operating range each of the load branches is switched on after a switching on and prior to a switching off of the respectively other one of the load branches.

17. Control device for DC motors comprising:
a commutator for feeding motor windings of said DC motor, said commutator having at least four sliding contacts, the sliding contacts being combined to form at least two control groups, the sliding contacts being combined within each control group to form pairs of sliding contacts fed in parallel,
a modulation stage generating at least one control signal modulated as to pulse width with a clock frequency substantially above a motor speed, and
a control circuit controlled by the at least one control signal and having at least two load branches, each load branch being provided with an electronic switch controlled by the control signal modulated as to pulse width and a freewheeling component, in each of the load branches the electronic switch is located between a first connection of the pairs of sliding contacts of a respective control group and a first voltage connection, and a second connection of the pairs of sliding contacts of the respective control group is in communication with a second voltage connection, a freewheeling branch having as series connection a capacitor connected to the first voltage connection and an inductor connected to the second connection of the pairs of sliding contacts, the freewheeling component located between a central tap between the capacitor and the inductor of the freewheeling branch and the first connection of the pairs of sliding contacts, said freewheeling branch enabling a freewheeling current of the motor winding associated with the pairs of sliding contacts of the respective control group flowing via said freewheeling component when the electronic switch is opened.

18. Control device as defined in claim 17, wherein at least two load branches are connected in parallel to the one freewheeling branch.

19. Control device as defined in claim 18, wherein the at least two load branches are connected in parallel to the freewheeling branch in the same way.

20. Control device as defined in claim 17, wherein the at least two load branches have the same circuitry configuration.

21. Control device as defined in claim 17, wherein a first connection of the capacitor of the freewheeling branch is connected to a first connection of the electronic switch by means of a line having an inductance of less than 50 nano henry.

22. Control device as defined in claim 17, wherein a second connection of the capacitor of the freewheeling branch is connected to the respective freewheeling component with a line having an inductance of less than 50 nano henry.

23. Control device as defined in claim 17, wherein a product of a value of the inductor and a value of the capacitor in the freewheeling branch is greater than a square of a cycle time of the control signals modulated as to pulse width.

24. Control device as defined in claim 17, wherein the value of the capacitor of the freewheeling branch is greater than a product of a maximum value of the current through an inductive load located between the respective pairs of sliding contacts with a ten-fold cycle time, divided by a voltage between a supply voltage connection and a ground connection.

25. Control device for a DC motor, comprising:

a commutator for feeding motor windings, said commutator having at least four sliding contacts, at least four windings connected to said commutator such that each of said windings is commutatively arranged between a pair of successively arranged sliding contacts, a modulation stage generating control signals modulated as to pulse width with a clock frequency substantially above motor speed, and a control circuit controlled by at least one control signal and having at least two load branches, each load branch being provided with an electronic switch controlled by one of the control signals modulated as to pulse width, and each of said load branches being associated with said commutator for feeding power to a respective control group formed by two subsequent pairs of sliding contacts, with one sliding contact being a member of each of the two subsequent pairs of sliding contacts, each load branch feeding the windings connected to one of said respective control groups.

26. Control device for a DC motor comprising:

a commutator for feeding motor windings, said commutator having at least four sliding contacts, at least four windings connected to said commutator such that each of said windings is commutatively arranged between one of said sliding contacts and a successively arranged sliding contact, a modulation stage generating control signals modulated as to pulse width with a clock frequency substantially above the motor speed, and a control circuit controlled by at least one control signal and having at least two load branches each being provided with an electronic switch controlled by one of the control signals modulated as to pulse width, each of said load branches being connected to said commutator such that one of said sliding contacts is connected to one of said load branches and respective alternate ones of said sliding contacts are connected to respective other load branches for feeding said windings connected to said load branches via said sliding contacts of said commutator.

* * * * *